United States Patent [19]

Gallet

[11] 4,352,956

[45] Oct. 5, 1982

[54] MULTI-RESPONDER TELEPHONE INTERCEPT APPARATUS

[76] Inventor: Georges P. Gallet, 2 rue de Flandre, 35000 Rennes, France

[21] Appl. No.: 146,763

[22] Filed: May 5, 1980

Related U.S. Application Data

[63] Continuation of Ser. No. 936,232, Aug. 24, 1978, abandoned.

[30] Foreign Application Priority Data

Sep. 2, 1977 [FR] France ................................ 77 27157

[51] Int. Cl.³ .......................... H04M 1/64; H04M 3/50
[52] U.S. Cl. ................................ 179/6.04; 179/6.06; 179/6.16; 179/6.17; 179/18 B
[58] Field of Search .................... 179/6.03, 6.04, 6.06, 179/6.17, 27 FG, 18 B, 6.13, 6.16

[56] References Cited

U.S. PATENT DOCUMENTS

| | | |
|---|---|---|
| 2,824,907 | 2/1958 | Peterson . |
| 2,892,890 | 6/1959 | Pares . |
| 2,925,472 | 2/1960 | Pares . |
| 3,090,835 | 5/1963 | Kronigng . |
| 3,209,074 | 9/1965 | French . |
| 3,296,371 | 1/1967 | Fox . |
| 3,352,973 | 11/1967 | Bodenstein . |
| 3,482,057 | 12/1969 | Abbott et al. . |
| 3,586,786 | 6/1971 | Kezuka . |
| 3,809,810 | 5/1974 | Walker et al. . |
| 3,965,304 | 6/1976 | Marheine . |

FOREIGN PATENT DOCUMENTS

| | | |
|---|---|---|
| 1281192 | 10/1968 | Fed. Rep. of Germany . |
| 1964463 | 12/1969 | Fed. Rep. of Germany . |
| 2109579 | 9/1972 | Fed. Rep. of Germany . |
| 2321986 | 7/1975 | Fed. Rep. of Germany . |
| 2453715 | 5/1976 | Fed. Rep. of Germany . |

*Primary Examiner*—Raymond F. Cardillo, Jr.
*Attorney, Agent, or Firm*—Laff, Whitesel, Conte & Saret

[57] ABSTRACT

A multi-responder telephone apparatus includes a talking machine having a plurality of information tracks. Ten of those tracks contain zones for transmitting digits. An additional signalling track contains recorded coded signals for indicating the zone or sub-zone being read. A plurality of simulated subscriber circuits are connected to pairs of line wires for receiving telephone calls. The reading heads for the information tracks are connected in parallel with the simulated subscriber circuits. Each simulated subscriber circuit includes electronic switches for connecting one of the information track reading heads to the pair of wires linked to simulated subscriber circuit, under the control of a selector which is controlled by a translator with memory. The reading head of the signalling track is connected to a circuit which responds to received audibly coded signals and emits command signals to the translators. For each order signal received, the memory circuits individually deduce which electronic switch is to be closed. Each simulated subscriber circuit includes a ringing current detector which operates and thereafter releases the selector at a predetermined moment during a reading of the tracks.

7 Claims, 3 Drawing Figures

| TRACK NUMBER | START | TEXT | DIGITS | TEXT | DIGITS | TEXT | STOP |
|---|---|---|---|---|---|---|---|
| 0 | | THE NUMBER | 0 0 0 0 0 0 0 0 0 0 | I REPEAT... | 0 0 0 0 0 0 0 0 0 0 | THANK YOU | |
| 1 | | | 1 1 1 1 1 1 1 1 1 1 | | 1 1 1 1 1 1 1 1 1 1 | | |
| 2 | | | 2 2 2 2 2 2 2 2 2 2 | | 2 2 2 2 2 2 2 2 2 2 | | |
| 3 | | | 3 3 3 3 3 3 3 3 3 3 | | 3 3 3 3 3 3 3 3 3 3 | | |
| 4 | | | 4 4 4 4 4 4 4 4 4 4 | | 4 4 4 4 4 4 4 4 4 4 | | |
| 5 | | | 5 5 5 5 5 5 5 5 5 5 | | 5 5 5 5 5 5 5 5 5 5 | | |
| 6 | | | 6 6 6 6 6 6 6 6 6 6 | | 6 6 6 6 6 6 6 6 6 6 | | |
| 7 | | | 7 7 7 7 7 7 7 7 7 7 | | 7 7 7 7 7 7 7 7 7 7 | | |
| 8 | | | 8 8 8 8 8 8 8 8 8 8 | | 8 8 8 8 8 8 8 8 8 8 | | |
| 9 | | | 9 9 9 9 9 9 9 9 9 9 | | 9 9 9 9 9 9 9 9 9 9 | | |
| ATTENTION 10 | | HOLD THE LINE PLEASE | TONE TONE | | | TONE | |
| NOT USED AT 11 | | | | | | | |
| PRESENT 12 | | | | | | | |
| 13 | | | | | | | |
| 14 | | | | | | | |
| CODED TONE SIGNALS 15 | 0 | 1 | 2 3 4 5 6 7 8 9 10 11 | 12 | 13 14 15 16 17 18 19 20 21 22 | 23 | 24 |
| ORDERS | 0 | 1 | 2 3 4 5 6 7 8 9 10 11 | 1 | 2 3 4 5 6 7 8 9 10 11 | 1 | 0 |

FIG.1

| TRACK NUMBER | START | TEXT | DIGITS | TEXT | DIGITS | TEXT | STOP |
|---|---|---|---|---|---|---|---|
| 0 | | THE NUMBER | 0 0 0 0 0 0 0 0 0 0 | I REPEAT.... | 0 0 0 0 0 0 0 0 0 0 | THANK YOU | |
| 1 | | | 1 1 1 1 1 1 1 1 1 1 | | 1 1 1 1 1 1 1 1 1 1 | | |
| 2 | | | 2 2 2 2 2 2 2 2 2 2 | | 2 2 2 2 2 2 2 2 2 2 | | |
| 3 | | | 3 3 3 3 3 3 3 3 3 3 | | 3 3 3 3 3 3 3 3 3 3 | | |
| 4 | | | 4 4 4 4 4 4 4 4 4 4 | | 4 4 4 4 4 4 4 4 4 4 | | |
| 5 | | | 5 5 5 5 5 5 5 5 5 5 | | 5 5 5 5 5 5 5 5 5 5 | | |
| 6 | | | 6 6 6 6 6 6 6 6 6 6 | | 6 6 6 6 6 6 6 6 6 6 | | |
| 7 | | | 7 7 7 7 7 7 7 7 7 7 | | 7 7 7 7 7 7 7 7 7 7 | | |
| 8 | | | 8 8 8 8 8 8 8 8 8 8 | | 8 8 8 8 8 8 8 8 8 8 | | |
| 9 | | | 9 9 9 9 9 9 9 9 9 9 | | 9 9 9 9 9 9 9 9 9 9 | | |
| ATTENTION 10 | | HOLD THE LINE PLEASE | TONE | | | TONE | |
| NOT USED AT PRESENT 11 | | | TONE | | | | |
| 12 | | | TONE | | | | |
| 13 | | | | | | | |
| 14 | | | | | | | |
| CODED TONE SIGNALS 15 | 0 | 1 | 2 3 4 5 6 7 8 9 10 11 | 12 | 13 14 15 16 17 18 19 20 21 22 | 23 | 24 |
| ORDERS | 0 | 1 | 2 3 4 5 6 7 8 9 10 11 | 1 | 2 3 4 5 6 7 8 9 10 11 | 1 | 0 |

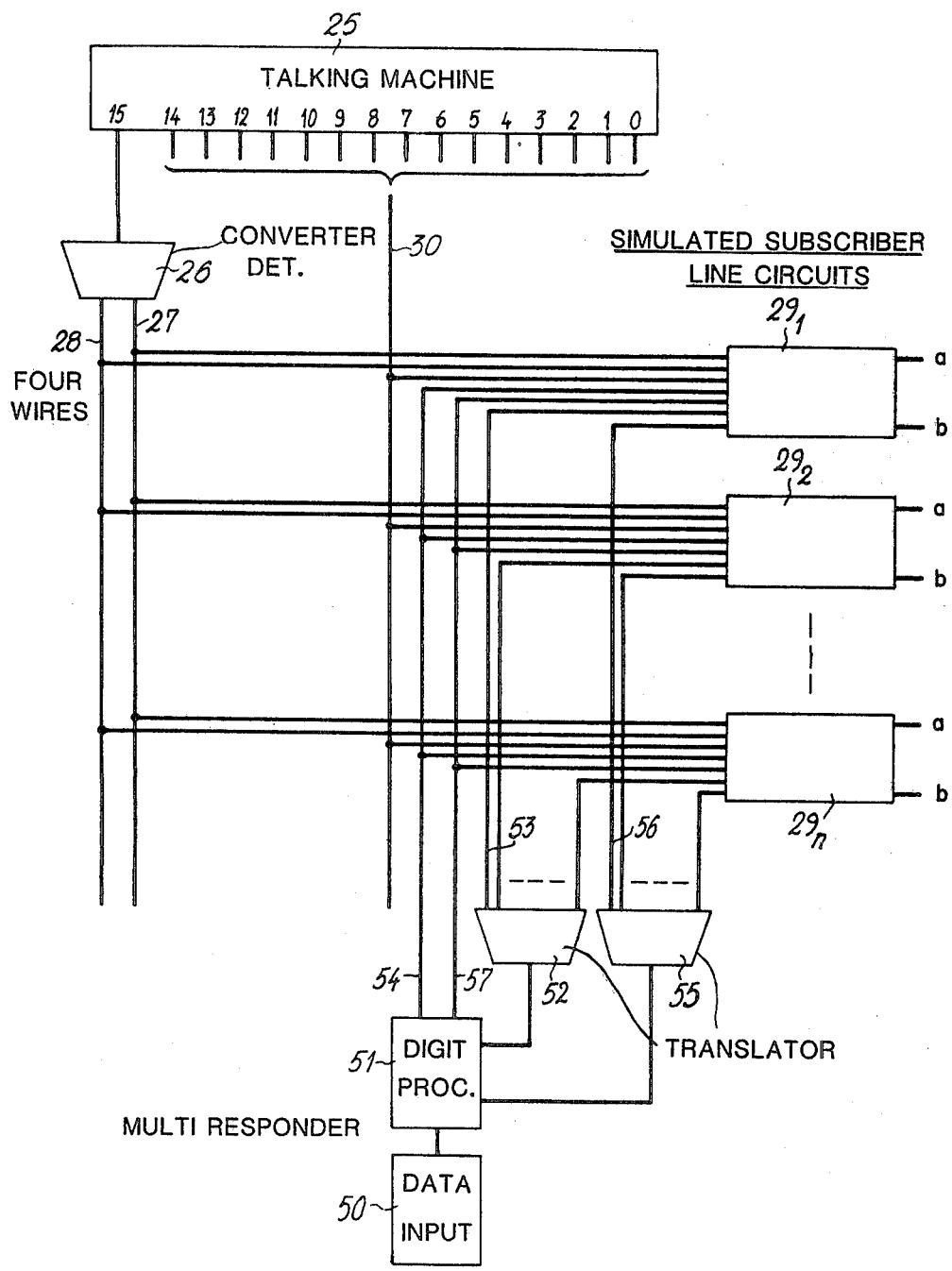

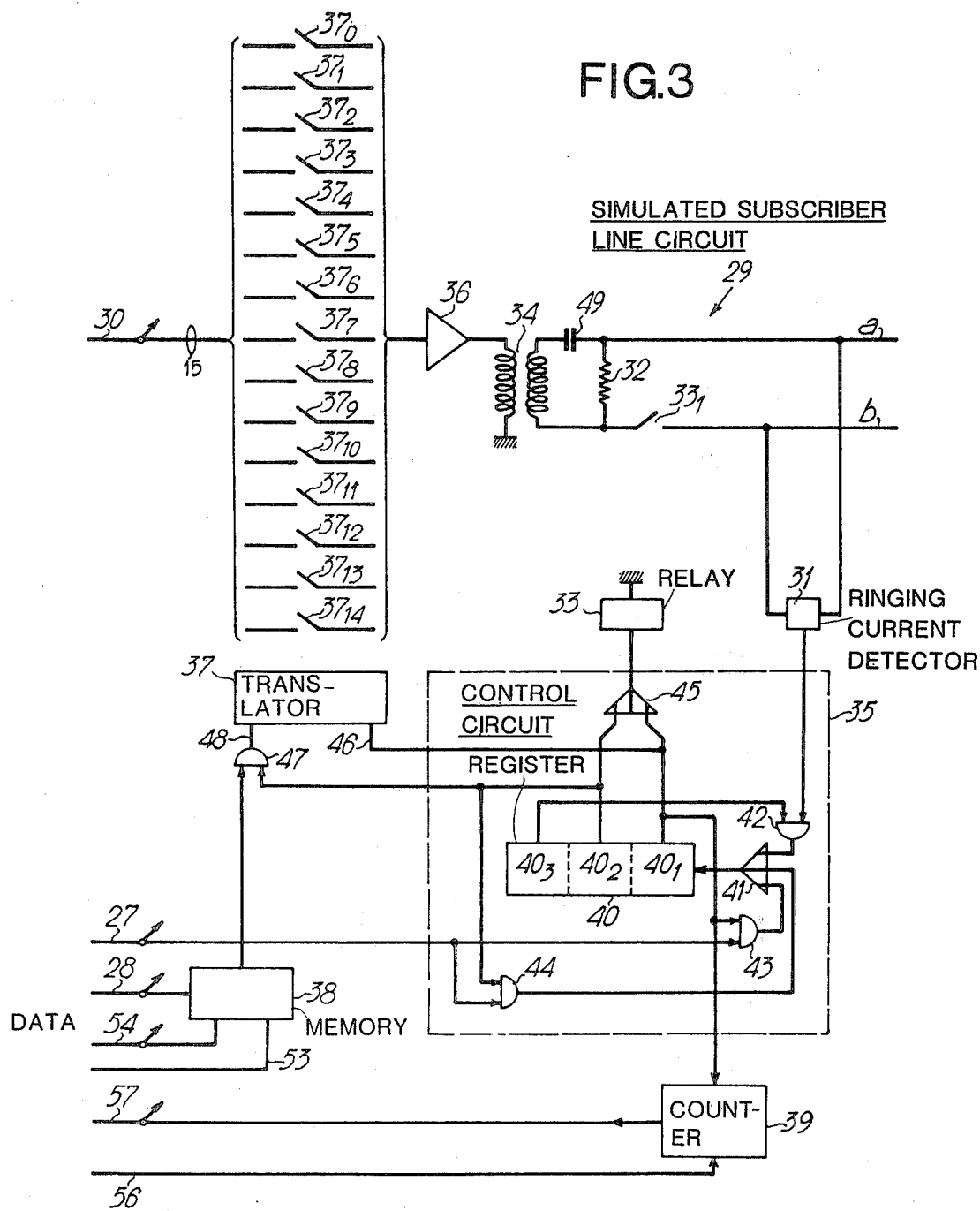

MULTI-RESPONDER TELEPHONE INTERCEPT APPARATUS

This is a continuation of application Ser. No. 936,232, filed Aug. 24, 1978 (now abandoned).

The present invention relates to a telephone multiresponder call intercept apparatus capable of replying simultaneously to several different calls arriving on several telephone lines.

The term "pips" is used herein to mean the individual sounds of an interrupted audible tone signals.

Telephone multi-responder call intercept apparatus is used in public or private telephone exchanges to give useful information to a subscriber caller who calls a number which has not been assigned or is no longer in use. In public telephone exchanges, when a first subscriber cancels his subscription or when his number is changed, there is a relatively long waiting time before the number of the first subscriber can be used again, in order to prevent the second subscriber from receiving too many calls which are not intended for him. Thus, in each telephone exchange, there are a certain number of lines which cannot be used. Furthermore, for technical reasons, the public telephone network administration may be obliged to regroup subscribers when a restructuring of the network appears to be the best way of providing a better service. These regroupings are often accompanied by changes in telephone numbers. In this case, numerous calls made to the old numbers, thus causing disturbances in the telephone traffic. A means must therefore be provided which will systematically inform the subscriber who calls a number which is not in use.

Among these means, there are talking machines having recorded messages requesting the subscriber to refer to the directory or to call directory enquiries. However, this increases the burden of the directory enquiries services. Therefore an apparatus has been sought which can give more detailed information to the caller, like for instance, the new number of the person being called. Among the apparatus which can give such specific information, there is the standard individual telephone responder with a magnetic tape which operates when a call is addressed to it and in reply, gives to the caller a message including the new number of the person being called. However, in extensive number change operations, a large number of such apparatus must be provided. The main unit is a recorder with magnetic tape, which greatly increases the cost of the operation, as staff trained in the methods of recording and considerable maintenance work are necessary. The advantage with an individual responder is, that there is no concentration of lines whose numbers have been changed, and replies can be made without waiting.

There are also multi-responders which regroup several lines around a talking machine which can emit phrases and figures in accordance with the digit to digit mode. The machine can only reply to one line at a time under the control of the digital computer. This means that if several lines are called simultaneously, only one is dealt with while the other emit the busy signal. In these known multi-responders for each line, the connection of not only the two A and B or tip and ring line wires, but also of the third wire or wire C (or sleeve) must be provided. The talking machine includes a recorder with magnetic tape having several tracks, there being as many tracks as there are possible parts of the phrase used in reply to the caller. That is to say, as an example, one track for the tone, one track for each digit from 0 to 9 and one for each part of the message. These tracks are regularly spaced on the tape so that they can be made to follow one another in time, while at the same time allowing a number with 10 digits to be repeated two or three times. Each track is linked to an audio amplifier output. In order to compile the reply phrase, the computer orders the connection of the audio amplifiers to the A and B (or tip and ring) wires succesively depending on the data stored in the memory which is relative to the line called.

An object of the present invention comprises providing a telephone multi-responder call intercept apparatus with a talking machine for emitting in the digit to digit mode which does not have the disadvantages of the known multi-responders, in that it operates with zero delay rates and zero loss probability, and in that it only requires connection to the two line wires A and B (or T and R). In fact, in certain types of automatic telephone exchanges the connection of the third or sleeve wire C is only possible at the expense of costly complications.

According to a characteristic of the invention, a telephone multi-responder call intercept apparatus is provided. A talking machine incorporates a plurality of information tracks, of which each of ten tracks contain DIGIT zones for transmission in a digit to digit mode. One signalling track carries recorded signals indicating a zone or a sub-zone being read. A plurality of simulated subscriber line circuits are connected to pairs of line wires for receiving telephone calls. The reading heads of the information tracks are connected in parallel to the false subscriber line circuits towards the pairs of wires. Each simulated subscriber line circuit includes a set of electronic contacts for enabling a connection of one of the information track reading heads to the pair of wires linked to the simulated subscriber circuit the connection being under the control of a selector controlled by a translator with a memory. The reading head of the signalling track being connected to a circuit which, depending on the audible coded signals received, emits command signals to the translators with memories which individually deduce, for each order signal received, which electronic contact is to be closed in the set of electronic contacts. Each simulated subscriber line circuit including in addition a ringing current detector which initiates the operation of the selector at a predetermined moment during the turning of the tracks of the talking machine and releasing it at the following predetermined moment.

The characteristics of the present invention mentioned above, in addition to others, will appear more clearly in the following description of an embodiment, the said description being made with reference to the attached drawings, in which:

FIG. 1 illustrates the contents of the tracks of a magnetic tape used in the talking machine which is a part of the multi-responder of the invention;

FIG. 2 is the block diagram of the multi-responder of the invention; and

FIG. 3 is the block diagram of a false subscriber circuit used in the multi-responder of FIG. 2.

The talking machine, of which the contents of the tracks of the magnetic tape is shown in FIG. 1, may be of the type of magnetic tape reader described in the French Patent Application 77 17971, filed on the June 7, 1977 (published under the number 2,394,140) in the joint names of Société Artistique Française S.A. and the Establissements M. Laudren et Cie, S.A., and entitled "Loop Connected Magnetic Tape Reader". In this reader, the loop connected magnetic tape rotates continuously past the reading head when information is to be transmitted.

As indicated in FIG. 1, the magnetic tape includes sixteen tracks, of which four are not used in this particular embodiment. These tracks are numbered from 0 to 10, plus the track 15. The initial and final points of all the tracks are on the same transversal sections of the tape. Each track 0 to 10 includes, in the longitudinal direction, a signal zone START, a first TEXT zone, a first DIGIT zone, a second TEXT zone, a second DIGIT zone, a third TEXT zone and a signal zone STOP. These zones are preferably the same length in all the tracks, but they are able to have different lengths between them. The track 15 includes the same zones as the tracks 0 to 10, but certain zones in this track are divided into sub-zones, zones and sub-zone being marked by a number. These START signals are the same in all the tracks and constitute an easily detectable voice frequency signal. The same applies for the STOP signals which differ from the START signal, by frequency.

In the track 0, the first TEXT zone may contain the following recorded text: "The number you have asked for has been changed. Please dial the following number;". The second TEXT zone may contain the following recorded text: "I repeat. The number you have asked for has been changed. Please dial the following number;". The third TEXT zone may simply contain the following recorded text: "Thank you". The first and second DIGIT zones are each divided into 10 sub-zones of equal length in each of which is recorded the word "zero".

In the tracks 1 to 9, the TEXT zones are empty and the first and second DIGIT zones are each divided into 10 sub-zones of equal length, like the track 0, in each of which is recorded a word corresponding to the number of the track.

In track 10, in each TEXT zone is recorded, for example; "Hold the line please" whereas in the DIGIT zone pips of interrupted tone are recorded, the third TEXT zone being empty.

In track 15, immediately intelligible audible signals are not recorded as they are not intended to be transmitted to a subscriber, but there are coded tone signals which indicate the number of the zone or of the sub-zone of the other tracks which are being read. Thus, the code "0" corresponds to the START zone, the code "1" to the first TEXT zone, the codes "2" to "11" to the 10 sub-zones of the first DIGIT zone, the code "12" to the second TEXT zone, the codes "13" to "22" to the 10 sub-zones of the second DIGIT zone, the code "23" to the third TEXT zone and the code "24" to the STOP zone.

In the first part of the following description, it will be assumed that the tracks 11 to 14 are not in use, then it will be shown how they may be used. It must be noted that the identities of the tracks may be determined in binary code by four binary elements or bits.

The multi-responder in FIG. 2 includes a talking machine 25 having outputs 0 to 15 which emit the signals read by the reading heads assigned respectively to the tracks 0 to 15, shown in FIG. 1. The output 15 is connected to the input of a convertor detector 26 including a single wire output 27 and a four wire output 28 which emits four bits. The output 27 has a high level when the output 15 emits the code "0" or "24" and a low level for all the other codes. Thus, it may be said that the output 27 emits a signal for each passage of the STOP-START zones under the reading heads. The output conductors 28 are four wires which simultaneously carry the four bits representing the signals "1" to "11" depending on the correspondence between the line of track 15, FIG. 1, and the line which is indicated under this latter and designated by "orders". The outputs 27 and 28 are connected in parallel to the inputs corresponding to the simulated subscriber circuits $29_1$ to $29_n$. Elsewhere the outputs 0 to 14 of talking machine 25 are connected to a bundle of wires 30 which are connected in parallel to the inputs corresponding to the simulated subscriber circuits $29_1$ to $29_n$.

In FIG. 3 a simulated subscriber circuit 29 is shown, which may be any one of the circuits $29_1$ to $29_n$. In the circuit 29, the wires a and b (or the tip and ring) of the line, to which it is connected, are connected on the one hand, to the terminals of a ringing or call current detector 31, on the other hand to terminals of a resistor 32, via the intermediary of a make contact $33_1$. Finally, the tip and ring wires a and b are connected to the terminals of the secondary winding of a voice signal transformer 34, via the intermediary of the contact $33_1$ and of a large condenser 49. The ringing current detector 31 is preferably very fast, for example, of the electronic or electro-optical type, which enables an output signal to be emitted some two to three milli-seconds after the appearance of the periodic ringing current from the bell. The resistor 32 is of a suitable value for simulating the impedance of a telephone normally seen between the wires a and b, that is 600 ohms.

The output of the detector 31 is connected to the first input of a control circuit 35, of which one output is connected through a terminal of an electro-mechanical relay 33 to ground. Relay 33 activates the contact $33_1$. The primary winding of the transformer 34 has one terminal grounded and its other terminal connected to the output of a low-frequency amplifier 36. The input of amplifier 36 is connected in parallel, to the 15 wires of the group 30 via the intermediary of fifteen work contacts $37_0$ to $37_{14}$ respectively, which are controlled by a transistor circuit 37. The simulated subscriber circuit 29 is then completed by a memory 38 and a counter 39.

The control circuit 35 includes, as a non-limiting example, a shift register 40 including three ranks $40_1$, $40_2$ and $40_3$. The feed input of the register 40 is connected to the output of an OR gate 41 including three inputs respectively connected to the outputs of three AND gates 42 to 44. One of the inputs of the AND gate 42 is connected to the output of the detector 31 while the other output is connected to the output of the register rank $40_3$. One of the inputs of the AND gate 43 is connected to the wire 27 while the other is connected to the output of the register rank $40_1$. One of the inputs of the AND gate 44 is connected to the wire 27 while the other is connected to the output of the register rank $40_2$.

The output of the register rank $40_1$ is also connected in parallel, to the first input of an OR gate 45, to a control input 46 of the translator circuit 37 and to the signal input of the counter 39. The output of the register rank $40_2$ is also connected in parallel, to the second input of the OR gate 45 and to the first inputs of a series of four AND gates 47 of which the outputs are connected to the control inputs 48 of translator 37. The output of the OR gate 45 constitutes the output of control circuit 35 connected to the relay 33, possibly via the intermediary of an amplifier.

The memory 38 has its reading address inputs connected to four wires of 28 and its data outputs connected respectively to the second inputs of the AND gate 47.

When its input 46 is at the high level the translator circuit 37 closes the contact $37_{10}$. Depending on the combination of the wires at the high level of the outputs of the AND gates 47, the circuit 37 closes one of the contacts, and one only, among the contacts $37_0$ to $37_9$ or $37_{11}$ to $37_{14}$. The contacts are of course electronic contacts.

The operation of the multi-responder of the invention will now be described by assuming that a call is made on the line connected to the simulated subscriber line circuit 29. When the circuit 29 is inactive, the output of the rank $40_3$ of the register 40 is in the high state and the outputs of ranks $40_1$ and $40_2$ are in the low state. Therefore the translator circuit 37 is inactive as well as the relay 33. The contact $33_1$ is open (the notation $33_1$ means that this is the first contact on relay 33). On receipt of the ringing signal, the ringing circuit detector 31 operates and emits an output signal which opens gate 42. A feed signal is sent to the register 40 so that only the output of rank $40_1$ passes to the high state. Via the OR gate 45, the relay 33 is activated thus closing the loop via contact $33_1$ and simulating an off hook signal. The exchange acknowledges the closure of the subscriber loop, trips or eliminates the ringing current from the bell, and connects the caller.

As has been said above, the talking machine 25 operates almost permanently, so that on detection of a call by ringing current detector 31, as has been shown above, the START and STOP zones of the magnetic tape are not usually being read, which is the assumption in the following description.

In this case, the wire 27 is not at the high level and the output of register rank $40_1$ remains at the high level while activating the input 46 of translator 37. Therefore the contact $37_{10}$ is closed thus connecting, via wire 30, the input of the amplifier 36 with the output of the reading head which reads the track 10 of the tape. Thus, the text of the track 10 FIG. 1, is transmitted via the line, the intermediary of transformer 34 and capacitor 49, to the caller who is requested to hold the line.

As soon as the STOP zone is being read, the wire 27 passes to the high level and, via the gates 43 and 41, a feed signal is sent to the register 40. This is the order "0" FIG. 1. The output of the register rank $40_2$ passes to the high level, which via gate 45, keeps the relay 33 active and opens all the gates 47. On the other hand, the output of register rank $40_1$ passes to the low level, so that the contact $37_{10}$ is opened to cancel the transmission of the wait message.

As soon as the first TEXT zone is being read, the converter detector circuit 26 makes the wire 27 pass to the low level and the combination of the wire of 28 corresponding to the order "1" pass to the high level. The memory 38 receives over wires 28 the combination of order "1" and emits through its outputs to wire 48, via gate 47, a corresponding combination which initiates through transistor 37, the closure of contact $37_0$. The caller then receives the recorded contents of the first TEXT zone of the track 0.

As soon as the first sub-zone of the first DIGIT zone is being read, the converter detector circuit 26 emits to wires 28 the combination of an order "2" which is read in memory 38, as an address input, so that the memory 38 emits to translator 37 a combination signal corresponding to the first digit of the new number of the subscriber requested. If, for example, this first figure is a "9", the combination emitted through memory 38 causes the closure of the contact $37_9$ which connects the track 9 of talking machine 25 with the transformer 34, through amplifier 36. The caller hears the spoken word "9".

It must be understood that the memory 38 operates as a translator which makes an output signal correspond to a given address. Thus the memory successively combinations which represents a figure of the new number correspond to each successive order "2" to "11" FIG. 1. It makes the combination corresponding to the figure "0" which closes the contact $37_0$ correspond to each order "1", to enable the subscriber to hear the text of track 0. It will be seen in the following description how one can change the rules of correspondence in the memory 38.

When the second sub-zone of the first DIGIT zone is being read, the converter detector circuit 26 emits on wires 28 the combination of order "3" etc., until the reading of the second TEXT zone where the circuit 26 emits again the combination of order "3" so that the signal recorded on track 0 will be heard.

One then passes to the sub-zones of the second DIGIT zone where the coded signals 13 to 22 read on the track 15 are translated in converter detector 26 into order signals "2" to "11" thus causing the figures to be repeated by the memory 38. The third TEXT zone initiates then the order "1" for the last text.

At the new reading of the STOP zone, the wire 27 passes again to the high level thus opening the AND gate 44 and applying a feed signal to the register 40, of which the output rank $40_3$ alone passes to the high level. The relay 33 is released and this has the effect of simulating an ON hook replacement of the receiver by opening the contacts $33_1$ which breaks the line loop. The apparatus is returned to the initial state.

When the detection of the call by ringing current detector 31 takes place during the reading of the STOP and START zones, the speed of the register 40 is sufficient to enable the output of register rank $40_2$ to be at the high level at the end of the start, thus avoiding transmission of a waiting message to the caller. It is preferable for the circuit of the AND gate 43 to be such that the output of register rank $40_2$ only passes to the high level when the start signal is ended, that is to say at the transition from the high level to the low level on wire 27. In this way, there is no interference with the operation of the gate 44.

As shown in FIG. 2, the multi-responder includes in addition a data input apparatus 50 with coding wheels. The output of apparatus 50 is connected to a digital processing circuit 51 which enables a memory 38 to be chosen from the N memories of the simulated line circuits $29_1$ to $29_n$. A translator 52 sends an order to a line circuit where necessary, and the data which must be read is transmitted to translator 37 in accordance with the reading addresses emitted by converter detector 26. The translator 52 has as many output wires 53 as memories 38, the selection of a memory by processor 51 consisting in placing the wire 53 at the high level thus switching the memory in question into a writing position. The data output of processor 51 is connected by wire 54 in parallel to all the memories 38.

The processing circuit 51, by means of a translator 55, similar to translator 52, selects simultaneously a counter 39 in a circuit $29_1$ to $29_n$. The translator 55 has as many output wires 56 as counters 39. Furthermore, the counters have their outputs connected in parallel to a wire 57 entering the circuit 51. Thus signals from the circuit 51 causes a counter 39 to pass into the reading mode, signaling being through translator 55 and wire 56 and circuit 51 receives the contents of the counter 39 through 57. As the counter 39 is assumed to advance by 1 unit each time a call is received in the connected line circuit 29, when the output of register rank $40_1$ passes to the high level, each counter can be read individually.

In practice, the number of the simulated subscriber circuit, the number to be given and the reading of the counter appear as illuminated digits, when a writing or reading process is carried out on the data input apparatus 50.

In order to change a number to be given out through a simulated line circuit 29, it is only necessary to alter its memory 38, through data input circuit 50, translator 52, wires 53 and 54, and to connect the line circuit to another pair of wires a and b. This operation clears the counter 39 of the circuit. It is apparent that more than two DIGIT zones may be provided which are separated by as many TEXT zones as necessary. In addition a track which is different from the track 0 may be chosen for the texts to be transmitted, with the exception of the track 15. In addition the tracks 11 to 14 may be used for various other messages. In practice, these tracks may be assigned in this way for changes in number, or to inform users of extensive line disturbances, or of changes in dialling codes, for subscription cancellations, for interruptions of the service and for various announcements concerning instructions to agents of security services or messages for doctors.

It is possible to add to the set of 15 electronic contacts $37_0$ to $37_{14}$, a sixteenth contact $37_{15}$ which may be chosen by the four wires 28 and the suitably programmed memory 38. This contact $37_{15}$ may for instance, be connected to ground, so that when it is closed, no audible signal is sent on the wires a and b. This possibility may be used to include one or several periods of silence between the series of digits of the number to be given. It is clear that sub-zones must be included in the DIGIT zones in order to indicate that there are these periods of silence which are represented at the output on wires 28 of converter detector 26 by an order "12" which is decoded in memory 38.

I claim:

1. A telephone system having a plurality of two-wire subscriber lines terminating in individually associated line circuits, at least some of said lines being equipped for interception of telephone calls and having simulated subscriber line circuit means associated therewith, a multi-responder call intercept recording machine including a multi-track recording machine incorporating, ten of said tracks including individually associated DIGIT zones for recording spoken digit words in a digit-by-digit mode, at least one coded tone signal track to indicate a zone or a sub-zone which is being read, and at least one supplementary track having a recorded message requesting the caller to hold the line, reading head means individually associated with each of the tracks and being connected via electronic switches in parallel to apply recorded signals to said simulated subscriber line circuit means, said call intercept means including a translator means having a memory for selectively connecting each simulated subscriber line circuit means to individual ones of the said reading heads, via said electronic switches, means responsive to signals from the reading head of the signalling track then being reproduced for giving order signals to the translator means for individually operating the electronic switches as indicated by each order signal received, and each simulated subscriber line circuit means incorporating a ringing current detector means which initiates an operation of the means for connecting the line circuit, means in the simulated line circuit for activating a supplementary one of said electronic switches between the time when the said ringing current detector means operates and the time when a first of said signalling track is read, said supplementary electronic switch causing a reproduction of the hold the line message and preventing a digit line reproduction responsive to an operation of said translator means, means for thereafter opening said supplementary electronic switch and closing other electronic switches selected by the said translator means, and finally releasing the said simulated line circuit means following the reading of a zone from a signalling track.

2. Telephone multi-responder call intercept apparatus as claimed in claim 1, further characterized in that said electronic switches include a supplementary contact which is not individually associated with a track for inserting periods of silence in any message transmitted through said system.

3. Telephone multi-responder call intercept apparatus as claimed in one of the claims 1 or 2, further characterized in that each simulated line circuit means includes counter means for recording calls as they are received, said counter means being operated responsive to ringing current, and means for reading said individual counter means for data processing.

4. Telephone multi-responder call intercept apparatus as claims in one of the claims 1 or 2 characterized in that each simulated subscriber line circuit means includes said ringing current detector means connected in parallel with line wires associated with said line circuit means, means responsive to said ringing current detector means for applying a signal to a first input of a two-input AND gate, the output of said AND gate being connected through a first OR gate to a shift register means having three ranks, means for connecting a second input of said AND gate to the output of the first rank of said shift register, the output of said first rank being activated when the simulated subscriber line circuit means is inactive, the outputs of the second and third ranks of the said register being connected via a second OR gate to the winding of a relay which includes a make contact on one of the line wires, said make contact being interposed between the ringing current detector means and the recording machine.

5. Telephone multi-responder call intercept apparatus as claimed in claim 4, characterized in that the output of the second rank of said register is also connected to control operation of said translator means to select and operate said supplementary electronic switch, when said output of the second rank is activated.

6. Telephone multi-responder call intercept apparatus as claimed in claim 4, characterized in that it includes a second two-input AND gate has a first input connected to the output of the second rank of the said register and a second input of said second AND gate is connected to the output of the reading head of a signalling track, the second input being activated when the said head passes into the first of said zones of said track, and the output of said second AND gate being connected to an input of the first OR gate.

7. Telephone multi-responder call intercept apparatus as claimed in claim 6 characterized in that it includes a third two-input AND gate having a first input connected to the output of the third rank of said register, a second input of said third AND gate being connected to the output of the reading head of the said signalling track, the second input of said third AND gate being activated when the said head passes onto the final one of said zones of said track, and the output of which is connected to an input of the first OR gate, and means responsive to an operation of said shift register when active in the third rank for recycling to an activation of the first rank and the third releasing said relay which opens the simulated subscriber circuit line to terminate the communication.

* * * * *